Figure 1:
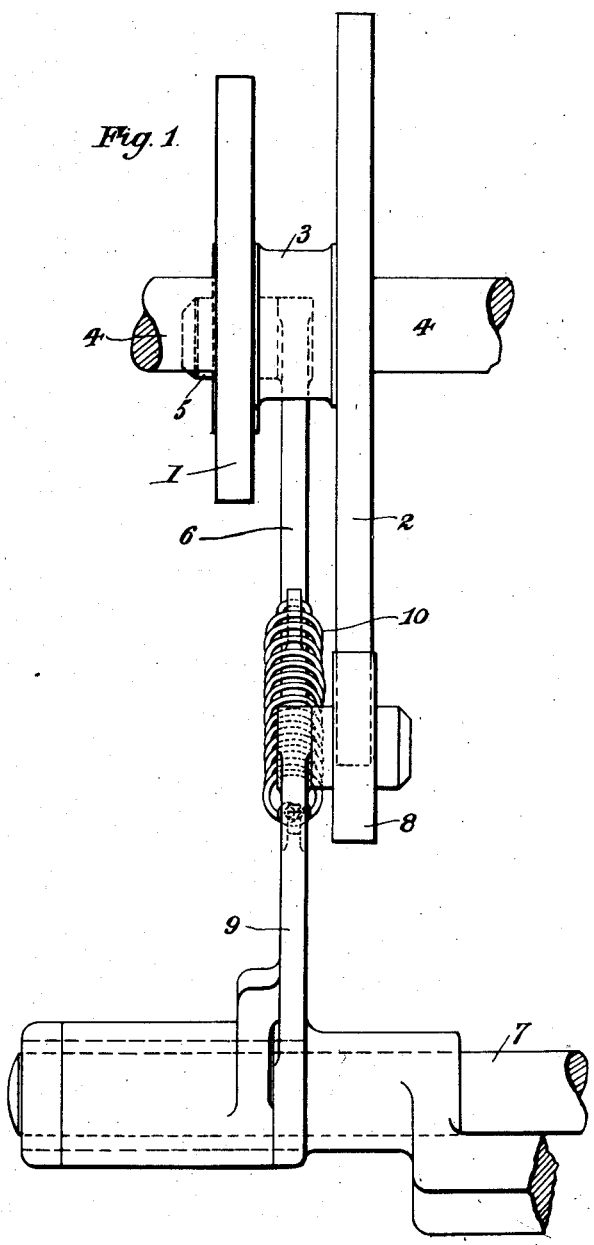

W. ROSE.
CAM AND LEVER.
APPLICATION FILED MAR. 18, 1910.

978,783.

Patented Dec. 13, 1910.
2 SHEETS—SHEET 1.

WITNESSES

INVENTOR
William Rose
BY
*Howson and Howson*
ATTORNEYS

W. ROSE.
CAM AND LEVER.
APPLICATION FILED MAR. 18, 1910.

978,783.

Patented Dec. 13, 1910.
2 SHEETS—SHEET 2.

INVENTOR
William Rose
BY
Howson and Howson
ATTORNEYS

WITNESSES

UNITED STATES PATENT OFFICE.

WILLIAM ROSE, OF GAINSBOROUGH, ENGLAND.

CAM AND LEVER.

978,783.  Specification of Letters Patent.  Patented Dec. 13, 1910.

Application filed March 18, 1910.  Serial No. 550,210.

*To all whom it may concern:*

Be it known that I, WILLIAM ROSE, a subject of the King of Great Britain and Ireland, of Albion Works, Gainsborough, in the county of Lincoln, England, have invented new and useful Improvements in or Relating to Cams and Levers or Arms Working in Connection Therewith, of which the following is a specification.

This invention relates to improvements in cams and levers, or arms, operated thereby, by which improvements more efficiency, less friction, less waste of power, reduced cost of production, and smoother working of the parts of the machine with which the cams are used are secured.

When a cam and a spring are employed, as is usual, to effect any required movements, the cam operating in one direction and the spring in the opposite direction, the spring must, of course, be of such power as to perform the work required in one direction, and the cam has not only to perform the work required from it, but also to overcome the power of the spring, this resulting in waste of power, and there is also risk of the spring breaking and causing annoyance and loss of time. When a grooved cam is employed, as is also usual, the roller, operating in the groove, rotates in one direction, when controlled by one side of the cam groove, and it rotates in the opposite direction, when controlled by the other side of the cam groove, so that, during every revolution of the cam, the roller has to reverse, which causes excessive friction and wear on the roller and the cam grooves.

This invention has for its object to obviate these objections, for which purpose I provide a duplex peripheral cam, consisting of two members which may be integral with each other, or be both secured to the same spindle, in any suitable way. Cam levers, or arms, are provided, one, to be operated by each member of the duplex cam. These levers, or arms, may both be affixed to, or mounted so as to rock on, a spindle, or shaft, one lever, or arm, being at one side of the cam shaft, and acted upon by one member of the duplex cam and the other lever, or arm, being on the other side of the cam shaft, and operated by the other member of the duplex cam. One member of the duplex cam is timed and designed to cause the desired movement in one direction, and the other member of the duplex cam is timed and designed for effecting the desired reverse movement. I may fix, or form, the two levers, or arms, together, or I may mount and secure one of the said levers, or arms, to a shaft, and mount the other lever, or arm, for the reverse movement, freely on the same shaft, but hold it in relation to the first named lever by a coiled tension spring, there being provided a device, such as a projection from one, or each, of the said levers, or arms, abutting and acting as a stop, or stops, to maintain the cam levers or arms, at the required angle in relation to each other, so as not to allow the said spring to put unnecessary pressure on the faces of the respective members of the duplex cam and thus reduce friction to a minimum. The said spring, should anything unusual happen to the machine, will yield and thus constitute a safeguard against shock.

Figure 2:
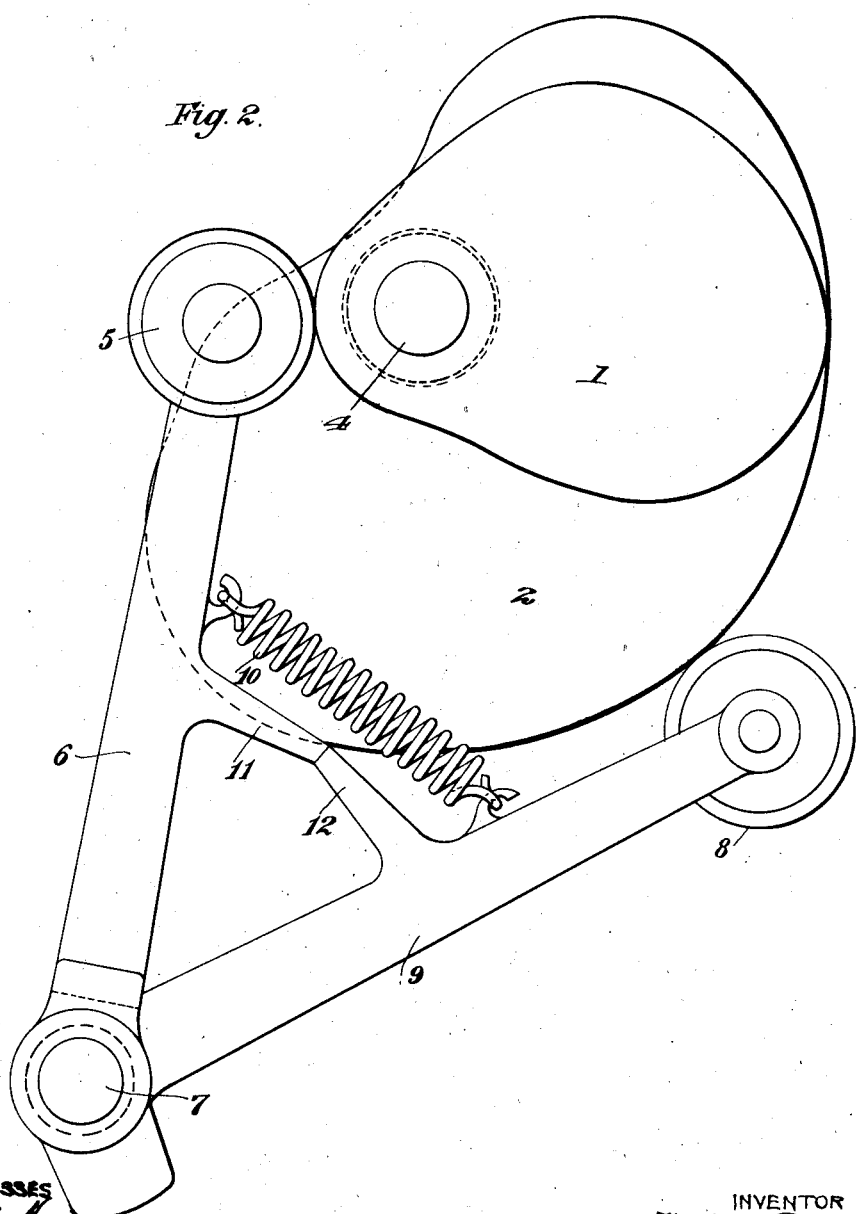

The accompanying drawing represents an arrangement in accordance with this invention, Figures 1 and 2 being views at right angles to each other. It will be understood that I do not limit myself to the precise details illustrated.

1 and 2 are the two members of the duplex cam connected together by the collar 3, and keyed to the shaft 4. The member 1 of the duplex cam bears on the roller 5, on the lever 6, keyed to the shaft 7, and the other member 2, of the duplex cam bears on the roller 8, on the lever 9, mounted freely on the said shaft 7. The spring 10, draws the two levers 6 and 9 together, undue force of the bearing of the rollers 5 and 8, on the members 1 and 2 of the duplex cam being prevented by the stops 11 and 12, on the levers 6, and 9, coming together.

What I claim is:—

In a cam operating device the combination with a rotating shaft, of a duplex cam thereon, two rockable lever arms, a spring connecting said lever arms, said lever arms having stops adapted to abut against each other and to relieve the lever arms of the pressure of the spring, all substantially as and for the object specified.

In testimony whereof I have signed my name to this specification, in the presence of two subscribing witnesses.

WILLIAM ROSE.

Witnesses:
 H. D. JAMESON,
 V. GIARDELLI.